United States Patent
Goodrich

[11] Patent Number: 5,956,884
[45] Date of Patent: Sep. 28, 1999

[54] REEL CLAMP AND GRIP ASSEMBLY

[76] Inventor: Jesse R. Goodrich, 68 N. School La., Souderton, Pa. 18964

[21] Appl. No.: 08/851,558

[22] Filed: May 6, 1997

Related U.S. Application Data

[63] Continuation of application No. 08/579,577, Dec. 26, 1995.
[51] Int. Cl.[6] .......................... A01K 87/06; A01K 87/00
[52] U.S. Cl. .......................................... 43/22; 43/23
[58] Field of Search .............................................. 43/22, 23

[56] References Cited

U.S. PATENT DOCUMENTS

| | | | |
|---|---|---|---|
| 718,589 | 1/1903 | Tredwell | 43/22 |
| 858,881 | 7/1907 | Letterman | 43/22 |
| 930,181 | 8/1909 | Huffman | 43/22 |
| 1,198,202 | 9/1916 | Drinkard | 43/23 |
| 1,331,312 | 2/1920 | Bartlett | 43/22 |
| 1,494,552 | 5/1924 | Kawell | 43/22 |
| 1,752,027 | 3/1930 | Pflueger | 43/22 |
| 1,995,242 | 3/1935 | Clarke | 43/22 |
| 2,685,755 | 8/1954 | Gorenflo | 43/23 |
| 2,711,047 | 6/1955 | Shepherd | 43/23 |
| 2,929,579 | 3/1960 | Hull | 43/22 |
| 3,068,603 | 12/1962 | Zeigler | 43/22 |
| 3,159,939 | 12/1964 | Transeau | 43/21.2 |
| 3,410,016 | 11/1968 | Arsenault | 43/21.2 |
| 3,416,662 | 12/1968 | Strahm | 43/22 |
| 3,419,992 | 1/1969 | Strahm | 43/22 |
| 4,453,332 | 6/1984 | Wightman | 43/23 |
| 4,697,377 | 10/1987 | Martin | 43/23 |
| 4,793,087 | 12/1988 | McGee | 43/22 |
| 5,012,607 | 5/1991 | Meschkat | 43/22 |
| 5,317,829 | 6/1994 | Balkcom | 43/22 |

*Primary Examiner*—Michael J. Carone
*Assistant Examiner*—Frederick T. French, III
*Attorney, Agent, or Firm*—Joseph W. Molasky & Associates

[57] ABSTRACT

A fishing rod provided with a reel clamp and finger grip assembly for ergonomic comfort with ease of use when fishing in deep lakes and/or ocean waters having a feature to secure the rod and reel assembly to a boat to avoid loss of the rod and reel assembly. The clamp is arranged to mount the reel on the rod in front of the handle and the finger grip on the rod at a position circumferentially spaced from the reel. This assembly is arranged to free the hand and body of the fisherperson by providing an alternative grip to eliminate tension and fatigue while fishing for long periods of time.

5 Claims, 2 Drawing Sheets

REEL CLAMP AND GRIP ASSEMBLY

This application is a Continuation of application Ser. No. 08/579,577 filed Dec. 26, 1995 pending.

BACKGROUND OF THE INVENTION

This invention relates to fishing rods with reels. More particularly, this invention relates to a fishing rod having a novel reel clamp and finger grip assembly.

In fishing, particularly in deep lakes or ocean water fishing, a person generally may have to hold the rod and reel assembly in one hand or other position for long periods of time, which can cause a strain on ones hands and body resulting in stress and fatigue and even the loss of fishing equipment during hand transfer.

There have been several fishing rods designed to ease the effort in fishing. However, until now, none have provided means to allow a fisherperson an alternative grip of rod and reel assembly for more freedom, less strain, and to fish for long periods of time without fatigue, strain, or possible loss of equipment.

SUMMARY OF THE INVENTION

This invention provides a fishing rod having a reel clamp and finger grip assembly to allow fisherpersons to fish free of stress, tension and fatigue for extended periods of time. The reel clamp and finger grip assembly comprises: (a) a clamping means arranged around a rod having a handle; (b) a reel mounted by said clamping means on said rod before said handle; and (c) a finger grip integral with the clamping means, said finger grip being securely mounted with said reel on said rod, whereby when a fisherperson inserts a finger into said finger grip, the rod is securely held and the hand and body of the fisherperson are free of fatigue and tension for an extended period of time by allowing for an alternative grip of the rod and reel assembly.

A primary object of the present invention is to provide a means to allow a fisherperson (i.e., user) to fish with any rod and reel with comfort and freedom from fatigue and tension for longer periods of time.

Another object of the present invention is to provide a means for a fisherperson to securely hold a fishing rod even when the hands or rod is coated with fish slime or other slippery materials.

A further object of the present invention is to provide an assembly as hereinafter described which can be removably mounted on any suitable fishing rod.

DETAILED DESCRIPTION OF THE PREFERRED EMBODIMENTS

The present reel clamp and finger grip assembly is designed and arranged to be mounted on a fishing rod for fishing with more ease and comfort for extended periods of time while providing a secure grip.

Figure 1:
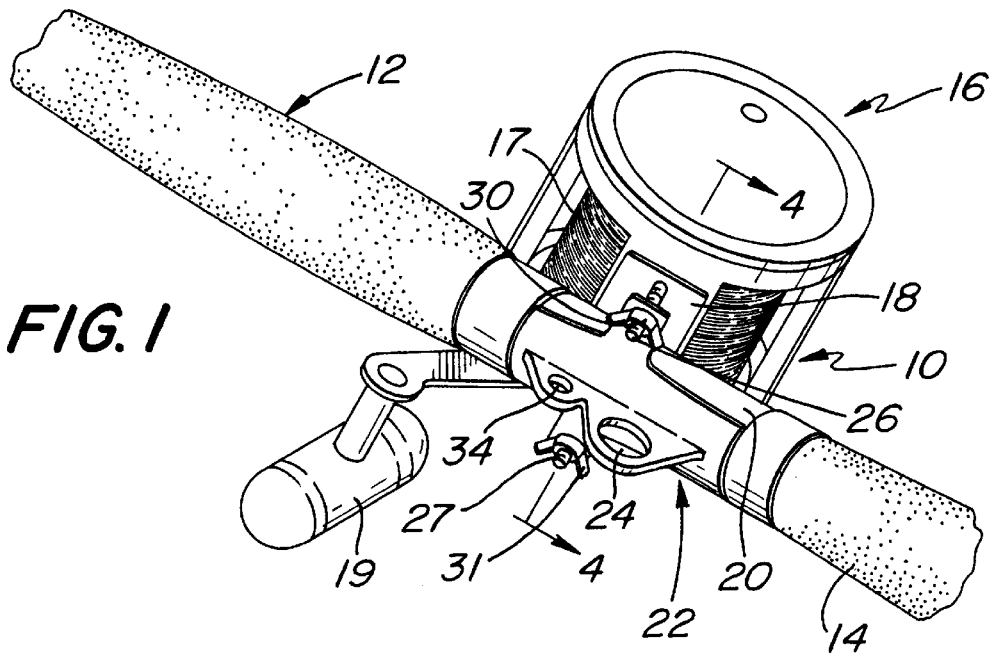
FIG. 1 is a schematic view of the present reel clamp and finger grip assembly mounted on a fishing rod.

As shown in FIG. 1, the reel clamp and finger grip assembly is generally referred to as (10). The assembly (10) comprises a reel (16), a clamping means (22) by which the reel (16) is mounted on a rod (12). And formed as an integral part of the clamping means (22), a finger grip (24) is provided for insertion of a finger of the user (i.e., fisherperson). The reel (16) is mounted in front of the handle (20) of the rod (12) and the finger grip (24) is mounted on the rod (12) at a position circumferentially spaced from the reel (16). The reel (16) has a handle (19) by which the string (17) or line is let out from or wound around the reel (16).

The clamp (22) along with the finger grip (24) may have a snap ring hole (34) through which a safety line may extend to secure the rod (12) in a rod holder or cylinder on a fishing boat.

Figure 2:
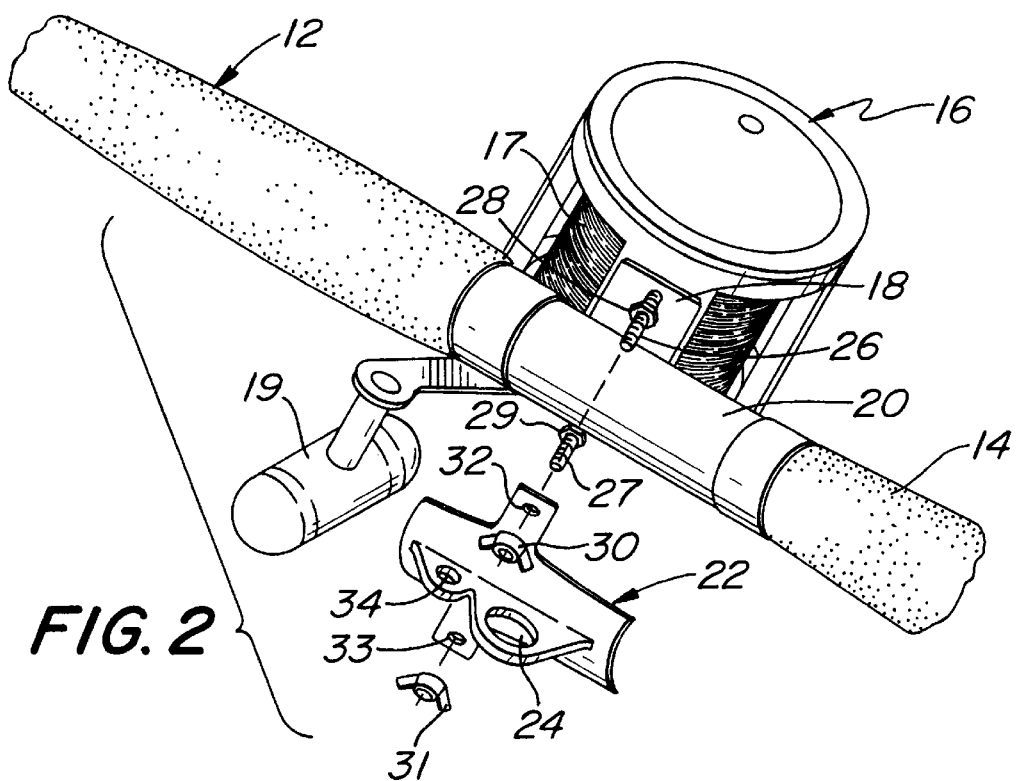
FIG. 2 is a schematic view of the unassembled and unmounted reel clamp and finger grip assembly of FIG. 1.
Figure 4:
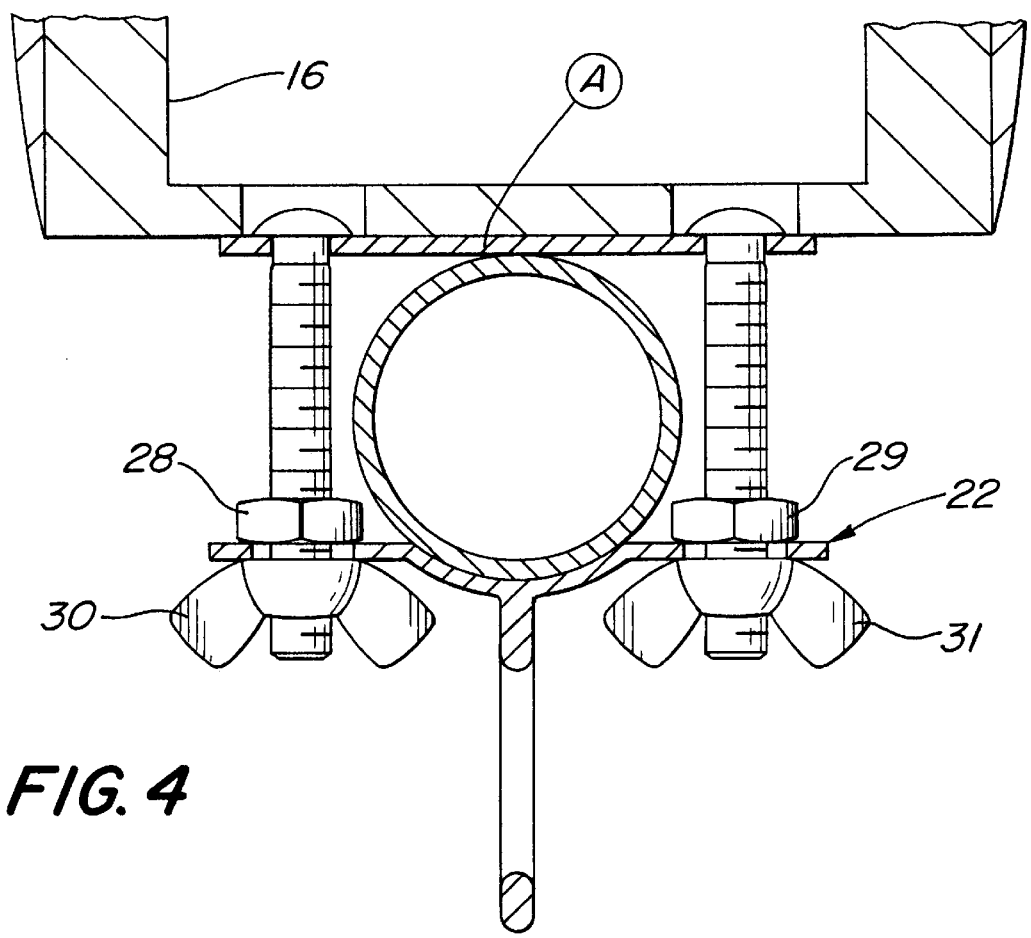
FIG. 4 is a cross-sectional view taken along line 4—4 of FIG. 1.

As illustrated in FIGS. 1 and 2 and specifically shown in FIG. 4, the reel (16) is positioned on a seat (20) of the rod (12) and secured by bolts (26,27) extending through and from a reel plate (18) and through the clamping means or clamp (22). The reel plate (18) and clamp (22) are secured against and around the rod (12) by the arrangement of the bolts (26,27) through the reel plate (18) and secured, respectively, by nuts (28,29) above and wing nuts (30,31) below the clamp (22). The bolts (26,27) extend, respectively, through holes (32,33) of clamp (22).

According to this invention, the reel (16), clamp (22), and finger grip (24) are removably mounted on the rod (12). That is, by loosening the wing nuts (30,31), respectively, from the bolts (26,27), the reel (16) and the clamp (22) and finger grip (24) may be removed from the rod (12).

Also, as shown in FIGS. 1 and 2 and indicated above, the finger grip (24), i.e., an arcuate opening, is circumferentially spaced from the reel (16) and may be mounted directly beneath the reel on the rod (12). Preferably, the finger grip (24) is circumferentially spaced about 180° from the reel (16) on the rod (12).

Figure 3:
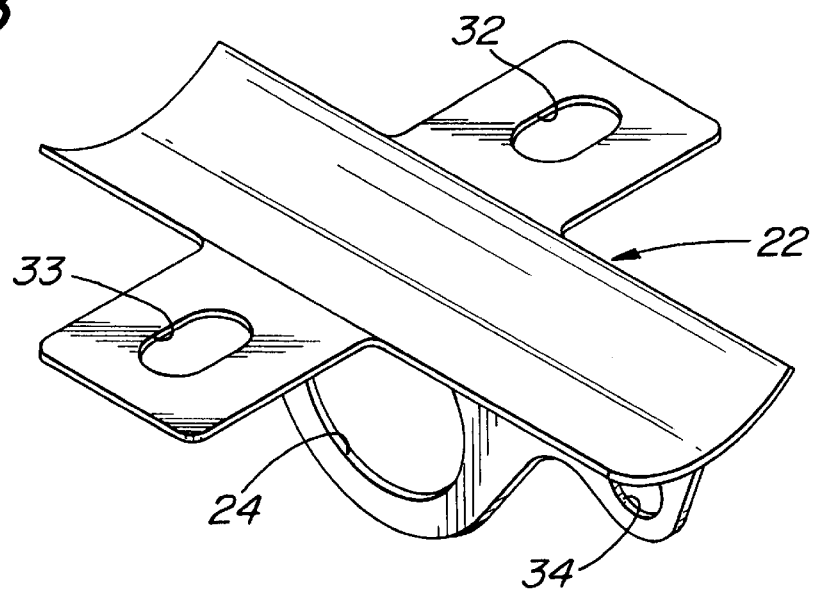
FIG. 3 is a perspective view of the reel and finger grip clamp, alone.

The clamp (22), as shown in FIG. 3, is a one-piece member of which the finger grip (24) is an integral part. The clamp (22) and finger grip (24) may be made of the same material. A metal is preferred such as aluminum which is light and durable. However, a plastic such as PVC may be used because of its weight and strength.

Another advantage in using the present reel clamp and finger grip assembly (10) is to provide and maintain a secure grip of the rod (12) even when slime builds up on the hands of the fisherperson or rod from the fish.

While the preferred embodiments have been fully described and depicted for the purposes of explaining the principles of the present invention, it will be appreciated by those skilled in the art that modification and changes may be made thereto without departing from the scope of the invention set forth in the appended claims.

What is claimed is:

1. A detachable assembly for mounting onto a fishing rod and reel which comprises:

(1) a grip assembly consisting essentially of an elongate, arcuately shaped base for engaging said rod and a grip member integrally joined to the underside of said base, said grip member containing two apertures, one of which serves as a finger grip, and the other being a snap ring hole substantially smaller than said finger grip and serving as a tie means for securing said assembly to a boat or pier;

(2) two outwardly extending members oppositely joined to said base, each member being equipped with holes for receiving bolt fastening means;

(3) a mounting plate joined to the underside of a fishing reel, said plate being equipped with bolt and nut means for engaging said outwardly extending members.

2. The assembly of claim 1 wherein said grip assembly is fabricated from metal.

3. The assembly of claim 2 wherein said metal is aluminum.

4. The assembly of claim 1 wherein said grip assembly is fabricated from plastic.

5. The assembly of claim 1 wherein said nut and bolt means includes wing nuts for securing said grip assembly to said mounting plate.

\* \* \* \* \*